United States Patent
Kang

(10) Patent No.: US 8,842,171 B2
(45) Date of Patent: Sep. 23, 2014

(54) STEREOSCOPIC IMAGE DISPLAY DEVICE AND DRIVING METHOD THEREOF

(75) Inventor: Taeuk Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 671 days.

(21) Appl. No.: 13/207,666

(22) Filed: Aug. 11, 2011

(65) Prior Publication Data

US 2012/0044333 A1 Feb. 23, 2012

(30) Foreign Application Priority Data

Aug. 23, 2010 (KR) .......................... 10-2010-0081526

(51) Int. Cl.
*H04N 13/04* (2006.01)
*G09G 3/34* (2006.01)

(52) U.S. Cl.
CPC ......... *H04N 13/0438* (2013.01); *G09G 3/3406* (2013.01); *G09G 2380/00* (2013.01); *G09G 2310/06* (2013.01); *G09G 2310/0237* (2013.01)
USPC .................. 348/56; 345/102; 345/76; 362/97

(58) Field of Classification Search
None
See application file for complete search history.

(56) References Cited

U.S. PATENT DOCUMENTS

| | | | |
|---|---|---|---|
| 7,348,952 B2 * | 3/2008 | Chang | 345/87 |
| 7,364,306 B2 * | 4/2008 | Margulis | 353/31 |
| 7,400,308 B2 * | 7/2008 | Chang | 345/76 |
| 7,609,240 B2 * | 10/2009 | Park et al. | 345/82 |
| 2007/0195408 A1 * | 8/2007 | Divelbiss et al. | 359/462 |
| 2008/0203929 A1 | 8/2008 | Park et al. | |
| 2009/0237495 A1 * | 9/2009 | Kawahara | 348/56 |
| 2010/0020062 A1 * | 1/2010 | Liou et al. | 345/213 |
| 2010/0066657 A1 | 3/2010 | Park et al. | |
| 2010/0066661 A1 * | 3/2010 | Kawahara | 345/102 |
| 2010/0066820 A1 * | 3/2010 | Park et al. | 348/53 |
| 2010/0188488 A1 * | 7/2010 | Birnbaum et al. | 348/53 |
| 2010/0201791 A1 * | 8/2010 | Slavenburg et al. | 348/53 |
| 2010/0202047 A1 * | 8/2010 | Maximus et al. | 359/464 |
| 2010/0207954 A1 * | 8/2010 | Kim | 345/589 |

FOREIGN PATENT DOCUMENTS

| | | |
|---|---|---|
| KR | 10-2008-0074682 A | 8/2008 |
| KR | 10-2009-0109766 A | 10/2009 |
| KR | 10-2010-0032284 A | 3/2010 |
| KR | 10-2011-0115410 A | 10/2011 |

OTHER PUBLICATIONS

Korean Office Action dated May 23, 2013 for corresponding application No. KR 10-2010-0081526.

* cited by examiner

*Primary Examiner* — Jay Patel
*Assistant Examiner* — Reza Aghevli
(74) *Attorney, Agent, or Firm* — Morgan, Lewis & Bockius LLP

(57) ABSTRACT

A stereoscopic image display device comprises: a display device that displays left-eye image data in a left-eye frame and right-eye image data in a right-eye frame; liquid crystal shutter glasses that alternately open and close a left-eye shutter and a right-eye shutter in synchronization with the display device; and a control circuit that controls the ON duty ratio of a backlight of the display device to a first set value if the luminance of each of the left-eye and right-eye frames is less than a predetermined reference value, and controls the ON duty ratio of the backlight of the display device to a second set value if the luminance of each of the left-eye and right-eye frames is greater than the reference value.

18 Claims, 7 Drawing Sheets

STEREOSCOPIC IMAGE DISPLAY DEVICE AND DRIVING METHOD THEREOF

This application claims the benefit of Korea Patent Application No. 10-2010-0081526 filed on Aug. 23, 2010, which is incorporated herein by reference for all purposes as if fully set forth herein.

BACKGROUND

1. Field

This document relates to a stereoscopic image display device for displaying a three dimensional (3D) stereoscopic image (hereinafter, referred to as a 3D image) and a driving method thereof.

2. Related Art

A stereoscopic image display device displays a 3D image using a stereoscopic technique or an autostereoscopic technique.

The stereoscopic technique, which uses a parallax image of left and right eyes of a user with a high stereoscopic effect, includes a glass method and a non-glass method both of which have been put to practical use. In the non-glass method, an optical plate, such as a parallax barrier or the like, for separating an optical axis of the left and right parallax image is installed in front of or behind a display screen. In the glass method, a left and right parallax image is displayed on a liquid crystal display panel by changing a polarization direction of the left and right parallax image, and a stereoscopic image is implemented using polarized glasses or liquid crystal shutter glasses.

The glass method is roughly classified into a first polarization filter method using a patterned retarder film and polarization glasses, a second polarization filter method using a switching liquid crystal layer and polarization glasses, and a liquid crystal shutter glass method. In the first and second polarization filter methods, the transmission of a 3D image is low due to the patterned retarder film or switching liquid crystal layer disposed on the liquid crystal display panel to act as a polarization filter.

In the liquid crystal shutter glass method, a left eye image and a right eye image are alternately displayed for each frame on a display device, and left- and right-eye shutters of the liquid crystal shutter glasses are opened and closed in synchronization with this display timing to implement a 3D image. The liquid crystal shutter glasses create a binocular parallax in a time-division manner by opening only the left-eye shutter during an nth frame period in which the left-eye image is displayed and opening only the right-eye shutter during an (n+1)th frame period in which the right-eye image is displayed.

The stereoscopic image display device may comprise a hold type display device such as a liquid crystal display (LCD). 3D crosstalk seen as ghost images occurs in the liquid crystal display due to low response speed of liquid crystals at a time when the liquid crystal display switches from the left-eye image to the right-eye image or from the right-eye image to the left-eye image.

In other words, assuming that, as shown in FIG. 1, the left-eye shutter of the liquid crystal shutter glasses ST is opened during the nth frame period Fn and the right-eye shutter of the liquid crystal shutter glasses ST is opened during the (n+1)th frame period Fn+1, left-eye image data L(Fn) is sequentially written to the liquid crystal display during the n-frame period Fn, and right-eye image data R(Fn+1) is sequentially written thereto during the (n+1)th frame period (Fn+1). While the left-eye shutter of the liquid crystal shutter glasses ST is opened within the nth frame period Fn, some pixels, whose liquid crystal response to the left-eye image L(Fn) is not completed, are affected by the right-eye image data R(Fn−1) of the (n−1)th frame. Accordingly, the observer's left eye sees part of the right-eye image R(Fn−1) of the (n−1)th frame, as well as the left-eye image L(Fn) of the nth frame, in an overlapped manner. Moreover, while the right-eye shutter of the liquid crystal shutter glasses ST is opened within the (n+1)th frame period Fn+1, some pixels, whose liquid crystal response to the right-eye image R(Fn+1) is not completed, are affected by the left-eye image data L(Fn) of the nth frame. Accordingly, the observer's left eye sees part of the left-eye image L(Fn) of the nth frame, as well as the right-eye image R(Fn+1) of the (n−1)th frame, in an overlapped manner.

3D crosstalk deteriorates image quality and causes dizziness.

SUMMARY

An aspect of this document is to provide a stereoscopic image display device, which can improve display quality level by reducing 3D crosstalk, and a driving method thereof.

In a first aspect, a stereoscopic image display device comprises: a display device that displays left-eye image data in a left-eye frame and right-eye image data in a right-eye frame; liquid crystal shutter glasses that alternately open and close a left-eye shutter and a right-eye shutter in synchronization with the display device; and a control circuit that controls the ON duty ratio of a backlight of the display device to a first set value if the luminance of each of the left-eye and right-eye frames is less than a predetermined reference value, and controls the ON duty ratio of the backlight of the display device to a second set value if the luminance of each of the left-eye and right-eye frames is greater than the reference value.

The reference value is set to 30% of the peak white luminance level.

The control circuit calculates a representative gray level value of the left-eye frame by analyzing the left-eye image data and determines the luminance of the left-eye frame based on the representative gray level value of the left-eye frame; and calculates a representative gray level value of the right-eye frame by analyzing the right-eye image data and determines the luminance of the right-eye frame based on the representative gray level value of the right-eye frame.

The first set value is less than $\frac{1}{3}$ of the second set value.

The first set value is 5%, and the second set value is 15 to 20%, preferably, 17%.

The left-eye frame comprises (n+1)th and (n+2)th frames displaying the same left-eye image data, and the right-eye frame comprises (n+3)th and (n+4)th frames displaying, the same right-eye image data; and the backlight of the display device is turned on in the (n+2)th and (n+4)th frames.

The control circuit inserts a black frame between the left-eye frame and the right-eye frame; the left-eye frame is the (n+1)th frame, the right-eye frame is the (n+3)th frame, and the black frame is the (n+2)th and (n+4)th frames; and the backlight of the display device is turned on in the (n+1)th and (n+3)th frames.

In a second aspect, a stereoscopic image display device comprises: a display device that displays left-eye image data in a left-eye frame and right-eye image data in a right-eye frame; liquid crystal shutter glasses that alternately open and close a left-eye shutter and a right-eye shutter in synchronization with the display device; and a control circuit that multiplies an input frame frequency to synchronize the display timing of the left-eye and right-eye image data with a 4× frame frequency, synchronize the turn-on timing of a backlight of the display device with the 4× frame frequency, and synchronize the shutter opening timing of the liquid crystal shutter glasses with a doubled frame frequency.

The left-eye frame comprises (n+1)th and (n+2)th frames displaying the same left-eye image data, and the right-eye frame comprises (n+3)th and (n+4)th frames displaying the same right-eye image data; the backlight of the display device is turned on with the same predetermined duty ratio in the (n+1)th, (n+2)th, (n+3)th, and (n+4)th frames; and the left-eye shutter is opened in a period overlapping with the turn-on period of the backlight within the (n+2)th frame and the left-eye shutter is opened in a period overlapping with the turn-on period of the backlight within the (n+4)th frame.

The control circuit inserts a black frame between the left-eye frame and the right-eye frame; the left-eye frame is the (n+1)th frame, the right-eye frame is the (n+3)th frame, and the black frame is the (n+2)th and (n+4)th frames; the backlight of the display device is turned on with the same predetermined duty ratio in the (n+1)th, (n+2)th, (n+3)th, and (n+4) th frames; and the left-eye shutter is opened in a period overlapping with the turn-on period of the backlight within the (n+1)th frame and the left-eye shutter is opened in a period overlapping with the turn-on period of the backlight within the (n+3)th frame.

A driving method of a stereoscopic image display device according to the first aspect of the present invention comprises: displaying left-eye image data in a left-eye frame and right-eye image data in a right-eye frame; alternately opening and closing a left-eye shutter and a right-eye shutter in synchronization with the display device; and controlling the ON duty ratio of a backlight of the display device to a first set value if the luminance of each of the left-eye and right-eye frames is less than a predetermined reference value, and controlling the ON duty ratio of the backlight of the display device to a second set value if the luminance of each of the left-eye and right-eye frames is greater than the reference value.

A driving method of a stereoscopic image display device according to the second aspect of the present invention comprises: displaying left-eye image data in a left-eye frame and right-eye image data in a right-eye frame; alternately opening and closing a left-eye shutter and a right-eye shutter in synchronization with the display device; and multiplying an input frame frequency to synchronize the display timing of the left-eye and right-eye image data with a 4× frame frequency, synchronize the turn-on timing of a backlight of the display device with the 4× frame frequency, and synchronize the shutter opening timing of the liquid crystal shutter glasses with a doubled frame frequency.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, exemplary embodiments of the present invention will be described in detail with reference to FIGS. 2 to 10.

Figure 1:
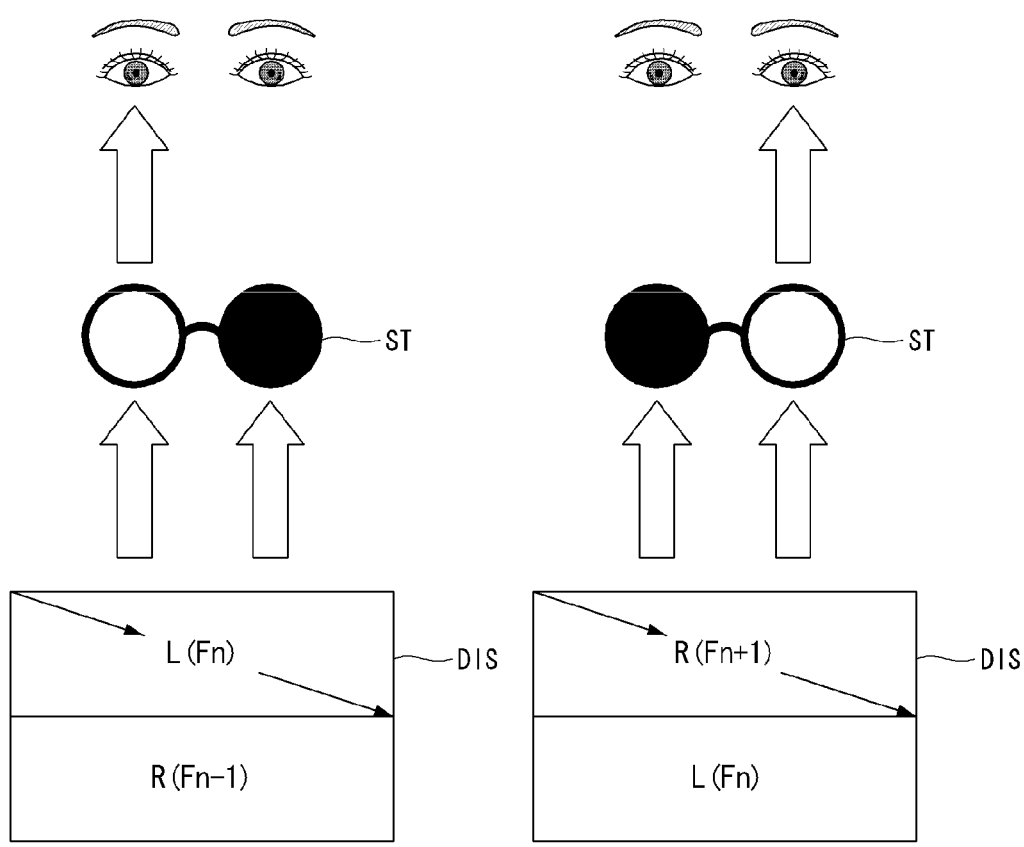
FIG. 1 is a view showing a time-division operation of a left/right eye image when a hold type display device is selected in a glass type stereoscopic image display device.
Figure 2:
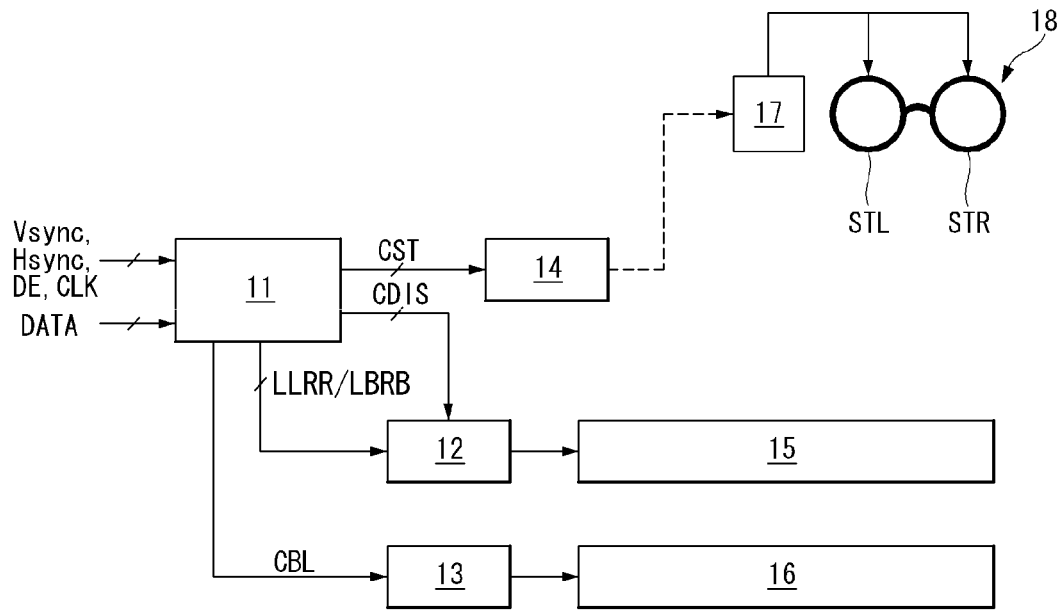
FIG. 2 shows a stereoscopic image display device according to an exemplary embodiment of the present invention.

FIG. 2 shows a stereoscopic image display device according to an exemplary embodiment of the present invention.

Referring to FIG. 2, the stereoscopic image display device according to the exemplary embodiment of the present invention comprises a display panel 15, a display panel driving circuit 12, a backlight unit 16, a backlight driving circuit 13, liquid crystal shutter glasses 18, a shutter control signal transmission unit 14, a shutter control signal reception unit 17, and a control circuit 11. Among them, the display panel driving circuit 12, the backlight driving circuit 13, the display panel 15, and the backlight unit 16 constitute the display device.

The display panel 15 alternately displays left-eye image data L and right-eye image data R for every predetermined cycle period under the control of the control circuit 11. The display panel 15 can display black data B, along with the left-eye and right-eye image data L and R, under the control of the control circuit 11. This display panel 15 may be implemented as a transmission type liquid crystal display panel that modulates light from the backlight unit 16 according to a data voltage applied to a liquid crystal layer. The transmission type liquid crystal display panel comprises a thin film transistor (hereinafter, referred to as "TFT") substrate and a color filter substrate. A liquid crystal layer is formed between the TFT substrate and the color filter substrate. On the TFT substrate, data lines and gate lines (or scan lines) are formed to cross each other on a lower glass substrate, and liquid crystal cells are disposed in a matrix form at pixel areas defined by crossings of the data lines and the gate lines. TFTs formed at the crossings of the data lines and gate lines transfer a data voltage supplied by way of the data lines to pixel electrodes of the liquid crystal cells in response to scan pulses from the gate lines. To this end, a gate electrode of the TFT is connected to the gate line, and a source electrode of the TFT is connected to the gate line. A drain electrode of the TFT is connected to the pixel electrode of the liquid crystal cell. A common voltage is applied to a common electrode facing the pixel electrode. The color filter substrate comprises a black matrix and color filters formed on an upper glass substrate. In a vertical field driving mode such as a twisted nematic (TN) mode and a vertical alignment (VA) mode, the common electrode is formed on the upper glass substrate, and in a horizontal field driving mode such as an in-plane switching (IPS) mode and a fringe field switching (FFS) mode, the common electrode is formed together with pixel electrodes on the lower glass substrate. Polarizers are attached to the upper and lower glass substrates of the transmission type liquid crystal display panel, respectively, and an alignment film for setting a pre-tilt angle of liquid crystal is formed thereon. A spacer is formed between the upper and lower glass substrates of the transmission type liquid crystal display panel to maintain a cell gap of the liquid crystal layer. The transmission type liquid crystal display panel may be implemented in any liquid crystal mode, as well as in the TN mode, the VA mode, the IPS mode, and the FFS mode.

The display panel driving circuit 12 comprises a data driving circuit and a gate driving circuit. The data driving circuit converts digital video data LLRR/LBRB input from the control circuit 11 into positive/negative gamma compensation voltages to generate positive/negative analog data voltages. The positive/negative analog data voltages output from the data driving circuit are supplied to the data lines of the display panel 15. The gate driving circuit sequentially supplies gate pulses (or scan pulses) in synchronization with the data voltages to the gate lines of the display panel 15.

The backlight unit 16 is turned on during a predetermined time to irradiate light to the display panel 15, and is turned off during other time periods. The backlight unit 16 is repeatedly turned on and off periodically. The backlight unit 16 comprises a light source to be turned on according to driving power supplied from the backlight driving circuit 13, a light guide plate (or diffusion plate), a plurality of optical sheets, and the like. The backlight unit 16 may be implemented as a direct type backlight unit or an edge type backlight unit. The light source of the backlight unit may include one or two or more of a HCFL (Hot Cathode Fluorescent Lamp), a CCFL (Cold Cathode Fluorescent Lamp), an EEFL (External Electrode Fluorescent Lamp), and an LED (Light Emitting Diode).

The backlight driving circuit 13 generates driving power to turn on the light source. The backlight driving circuit 13 supplies the driving power to the light source under the control of the control circuit 11.

The liquid crystal shutter glasses 18 comprise a left-eye shutter STL and a right-eye shutter STR which are separately controlled electrically. The left-eye shutter STL and the right-eye shutter STR each comprise a first transparent substrate, a first transparent electrode formed on the first transparent substrate, a second transparent substrate, a second transparent electrode formed on the second transparent substrate, and a liquid crystal layer formed between the first and second transparent substrates. A reference voltage is applied to the first transparent electrode, and an ON/OFF voltage is supplied to the second transparent electrode. When the ON voltage is supplied to the second transparent electrode in response to a shutter control signal CST, the left-eye shutter STL and the right-eye shutter STR each allow light from the display panel 15 to pass therethrough, while when the OFF voltage is supplied to the second transparent electrode, the left-eye shutter STL and the right-eye shutter STR intercept light from the display panel 15.

The liquid crystal shutter control signal transmission unit 14 is connected to the control circuit 11, and transmits a shutter control signal CST input from the control circuit 11 to the liquid crystal shutter control signal reception unit 17 via a wired/wireless interface. The liquid crystal shutter control signal reception unit 17 is installed in the liquid crystal shutter glasses 18 and receives the shutter control signal CST via the wired/wireless interface, and alternately opens and closes the left-eye shutter STL and the right-eye shutter STR of the liquid crystal shutter glasses 18 according to the shutter control signal CST. When the shutter control signal CST is input as a first logic value to the liquid crystal shutter control signal reception unit 17, the ON voltage is supplied to the second transparent electrode of the left-eye shutter STL while the OFF voltage is supplied to the second transparent electrode of the right-eye shutter STR. When the shutter control signal CST is input as a second logic value to the liquid crystal shutter control signal reception unit 17, the OFF voltage is supplied to the second transparent electrode of the left-eye shutter STL while the ON voltage is supplied to the second transparent electrode of the right-eye shutter STR. Accordingly, the left-eye shutter STL of the liquid crystal shutter glasses 18 is open when the shutter control signal CST is generated as the first logic value, and the right-eye shutter STR of the liquid crystal shutter glasses 18 is open when the shutter control signal CST is generated as the second logic value.

The control circuit 11 receives timing signals and digital video data RGB from a video source (not shown). The timing signals include a vertical synchronization signal Vsync, a horizontal synchronization signal Hsync, a data enable signal DE, a dot clock (CLK), and the like. The control circuit 11 separates left-eye image data L and right-eye image data R from the digital video data RGB input from the video source, and then doubles the separated left-eye and right-eye image data L and R, respectively, or generates black data B and assigns the black data B to a black frame between a left-eye frame displaying the left-eye image data L and a right-eye frame displaying the right-eye image data R. The control circuit supplies the doubled left-eye and right-eye image data LL and RR or the left-eye and right-eye image data LB and RB with the black data B inserted therebetween to the data driving circuit.

The control circuit 11 multiplies a frame frequency four times the input frame frequency, and generates a display panel control signal CDIS, a backlight control signal CBL, and a shutter control signal CST based on the four-times frame frequency. The input frame frequency is 50 Hz in a phase alternate line (PAL) scheme and 60 Hz in a national television standards committee (NTSC) scheme.

Figure 3:
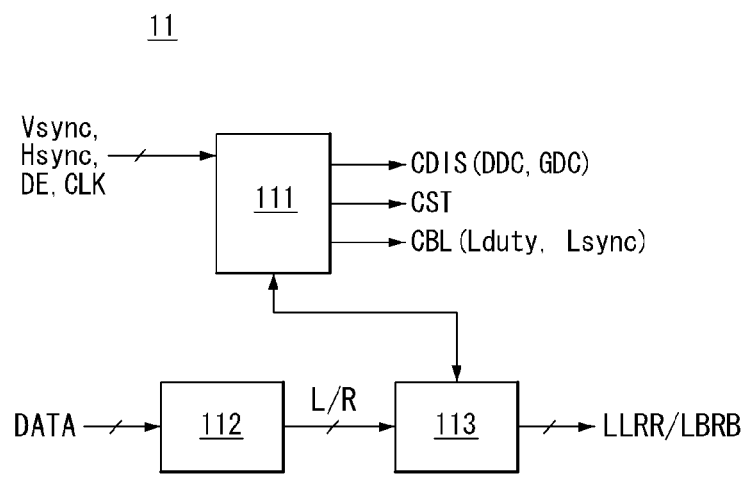
FIG. 3 shows in detail the control circuit of FIG. 2.

FIG. 3 shows in detail the control circuit 11 of FIG. 2.

Referring to FIG. 3, the control circuit 11 comprises a control signal generation unit 111, a data separating unit 112, and a data alignment unit 113.

The control signal generating unit 111 multiplies the frame frequency four times the input frame frequency by modulating the timing signals Vsync, Hsync, DE, and CLK, and generates a control signal CDIS, a backlight control signal CBL, and a shutter control signal CST based on the 4× frame frequency.

The display panel control signal CDIS includes a data control signal DDC for controlling an operation timing of the data driving circuit and a gate control signal GDC for controlling an operation timing of the gate driving circuit. The data control signal DDC includes a source start pulse SSP, a source sampling clock SSC, a source output enable signal SOE, a polarity control signal POL, and the like. The source start pulse SSP controls a data sampling start point of the data driving circuit. The source sampling clock SSC is a clock signal for controlling a sampling operation of the data driving circuit based on a rising edge or a falling edge. If digital video data to be input to the data driving circuit is transmitted according to a mini LVDS (Low Voltage Differential Signaling) interface standard, the source start pulse SSP and the source sampling clock SSC may be omitted. The polarity control signal POL inverts a polarity of a data voltage output from the data driving circuit every K (K is a positive integer) horizontal period. The source output enable signal SOE controls an output timing of the data driving circuit. The gate control signal includes a gate start pulse GSP, a gate shift clock GSC, a gate output enable signal GOE, and the like. The gate start pulse GSP controls a timing of a first gate pulse. The gate shift clock GSC is a clock signal for shifting the gate start pulse GSP. The gate output enable signal GOE controls an output timing of the gate driving circuit.

The backlight control signal CBL includes an ON duty control signal Lduty for controlling the ON duty ratio of the light source and an ON sync control signal Lsync for controlling the ON period of the light source. The backlight control signal CBL is supplied to the backlight driving circuit 13 to control the operation of the backlight driving circuit 13. The liquid crystal shutter control signal CST is transmitted to the shutter control signal transmission unit 17 to control the open and close timings of the left-eye shutter STL and the right-eye shutter STR of the liquid crystal shutter glasses 18.

The data separating unit 112 comprises a memory (not shown) to temporarily store the input digital video data in units of frames. Then, the digital video data stored in the memory is separated into left-eye image data L and right-eye image data R.

The data alignment unit 113 doubles the separated left-eye and right-eye image data L and R, respectively, and then assigns the same left-eye image data L to two continuous frames (LL) and the same right-eye image data R to two continuous frames (RR) in synchronization with the 4× frame frequency. Moreover, the data alignment unit 113 generates black data B, and assigns the black data B to a black frame between a left-eye frame displaying the left-eye image data L and a right-eye frame displaying the right-eye image data R (LBRB). The data alignment unit 113 may identify frame information by counting the number of modulated vertical synchronization signals.

FIGS. 4 to 7 show a first exemplary embodiment of the present invention for reducing 3D crosstalk.

Figure 4:
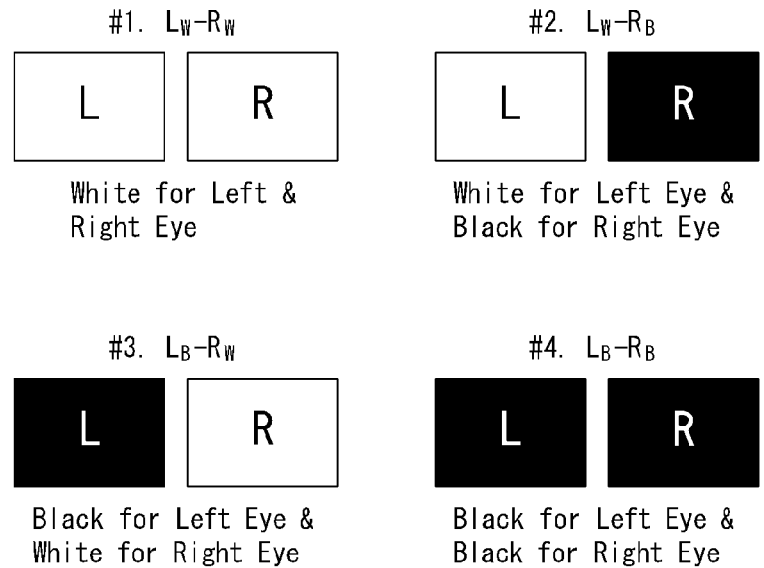
FIG. 4 is a view showing various luminance conditions of left- and right-eyes for defining 3D crosstalk.

Referring to FIG. 4, 3D crosstalk is defined by the following Equations 1 and 2:

$$3D \text{ Crosstalk} \atop (@ \text{ Left Eye}) = \frac{\text{Luminance with \#3} - \text{Luminance with \#4}}{\text{Luminance with \#2} - \text{Luminance with \#4}} \quad [\text{Equation 1}]$$

$$3D \text{ Crosstalk} \atop (@ \text{ Right Eye}) = \frac{\text{Luminance with \#2} - \text{Luminance with \#4}}{\text{Luminance with \#3} - \text{Luminance with \#4}} \quad [\text{Equation 2}]$$

In FIG. 4, #1 represents the left-eye and right-eye image data L and R both displayed at white level (LW-RW), #2 represents the left-eye image data L displayed at white level and the right-eye image data R displayed at black level (LW-RB), #3 represents the left-eye image data L displayed at black level and the right-eye image data R displayed at white level (LB-RW), and #4 represents the left-eye and right-eye image data L and R both displayed at black level (LB-RB).

Referring to Equation 1, it can be seen that the 3D crosstalk at the left eye decreases with decreasing luminance when the left-eye image data L is black and decreases with increasing luminance when the left-eye image data L is white. Similarly, referring to Equation 2, it can be seen that the 3D crosstalk at the right eye decreases with decreasing luminance when the right-eye image data R is black and decreases with increasing luminance when the right-eye image data R is white.

In view of this, in the first exemplary embodiment of the present invention, the ON duty ratio of the light source in a left-eye frame displaying the left-eye image data L is varied according to a luminance determination result based on a representative gray scale value of the left-eye frame. Moreover, in the first exemplary embodiment of the present invention, the ON duty ratio of the light source in a right-eye frame displaying the right-eye image data R is varied according to a luminance determination result based on a representative gray level value of the right-eye frame.

Figure 5:
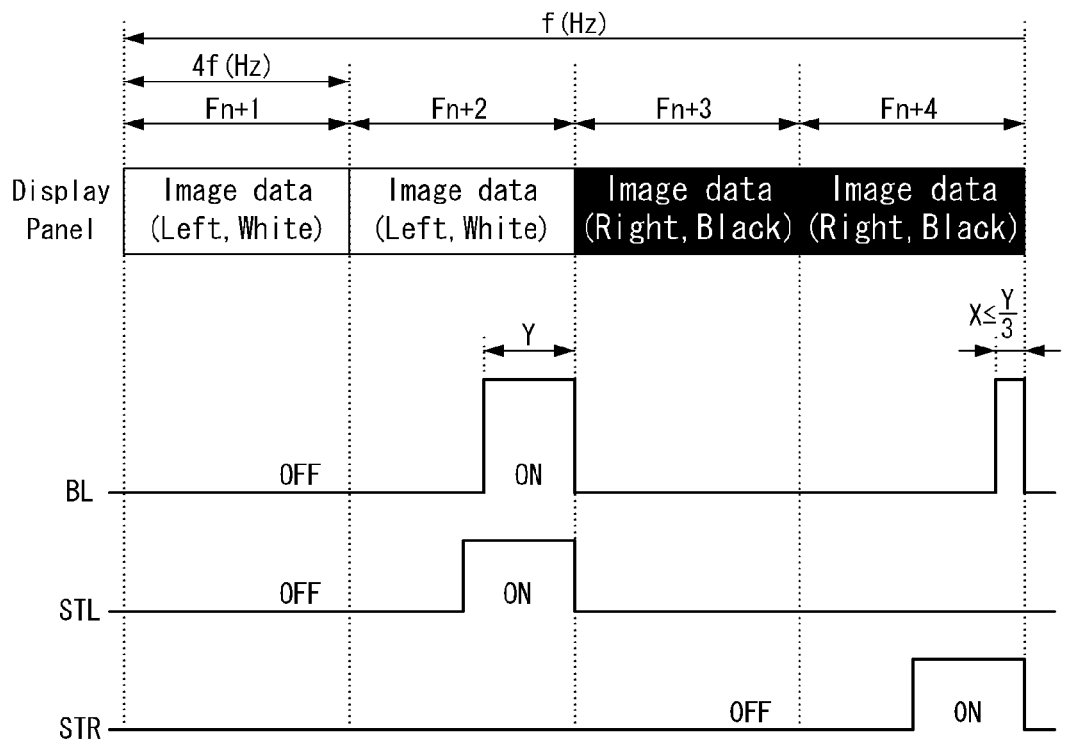
FIG. 5 shows an example of controlling the ON duty ratio of a light source in an LLRR method using a data doubling technique according to a first exemplary embodiment of the present invention.

FIG. 5 shows an example of controlling the ON duty ratio of the light source in an LLRR method using a data doubling technique.

The control circuit 11 time-divides an input frame into (n+1)th to (n+4)th frames Fn+1 to Fn+4 by multiplying the input frame frequency f(Hz) four times 4f (Hz). The control circuit 11 assigns the same left-eye image data to the left-eye frames, i.e., (n+1)th and (n+2)th frames Fn+1 and Fn+2, and assigns the same right-eye image data to the right-eye frames, i.e., (n+3)th and (n+4)th frames Fn+3 and Fn+4. The control circuit 11 analyzes the left-eye image data to calculate the representative gray level value of the left-eye frames, and determines the luminance of the left-eye frames based on the representative gray level value of the left-eye frames. Also, the control circuit 11 analyzes the right-eye image data to calculate the representative gray level value of the right-eye frames, and determines the luminance of the right-eye frames based on the representative gray level value of the right-eye frames.

Figure 7:
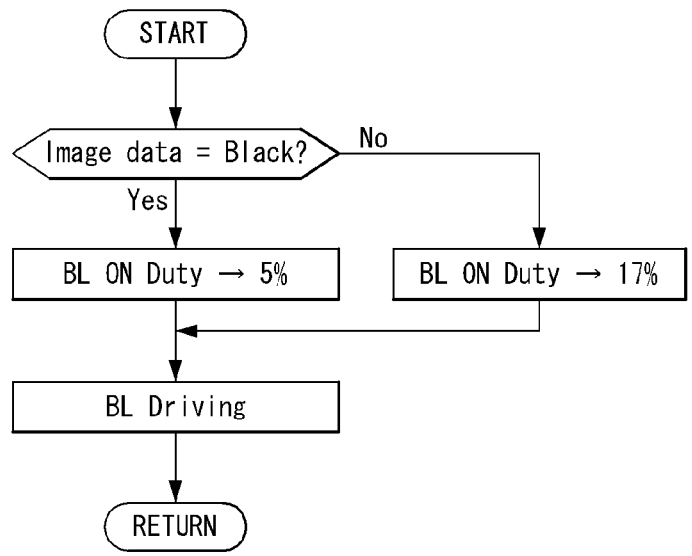
FIG. 7 is a view showing an operation flow of the control circuit which varies the ON duty ratio of the light source in a corresponding frame according to a representative gray level value of image data.

Moreover, as shown in FIG. 7, if the luminance of each of the left-eye and right-eye frames is less than a predetermined reference value, the image data is regarded as black and the ON duty ratio of the light source of the display device is controlled to a first set value. Otherwise, if the luminance of each of the left-eye and right-eye frames is greater than the predetermined reference value, the image data is regarded as white and the ON duty ratio of the light source of the display device is controlled to a second set value higher than the first set value. Here, the reference value may be set to 30% of the peak white luminance level. The first set value is 5%, and the second set value is 15 to 20%, preferably 17%.

For instance, as shown in FIG. 5; if the same left-eye image data is displayed at white level in the (n+1)th and (n+2)th frames Fn+1 and Fn+2 on the display panel 15 and the same right-eye image data is displayed at black level in the (n+3)th and (n+4)th frames Fn+3 and Fn+4 on the display panel 15, the control circuit 11 turns the light source BL on with a duty ratio of 17% (Y) within the (n+2)th frame Fn+2, and turns the light source BL on with a duty ratio of 5% (X) within the (n+4)th frame Fn+4. Next, the control circuit 11 opens the left-eye shutter STL of the liquid crystal shutter glasses 18 in a period overlapping with the light source turn-on period within the (n+2)th frame Fn+2, and the left-eye shutter STR of the liquid crystal shutter glasses 18 is opened in a period overlapping with the light source turn-on period within the (n+4)th frame Fn+4. By thusly decreasing the ON duty ratio of the light source BL in the black state, the luminance level of #3 in Equation 1 decreases and the luminance level of #2 in Equation 2 decreases. As, a result, 3D crosstalk is significantly reduced.

Figure 6:
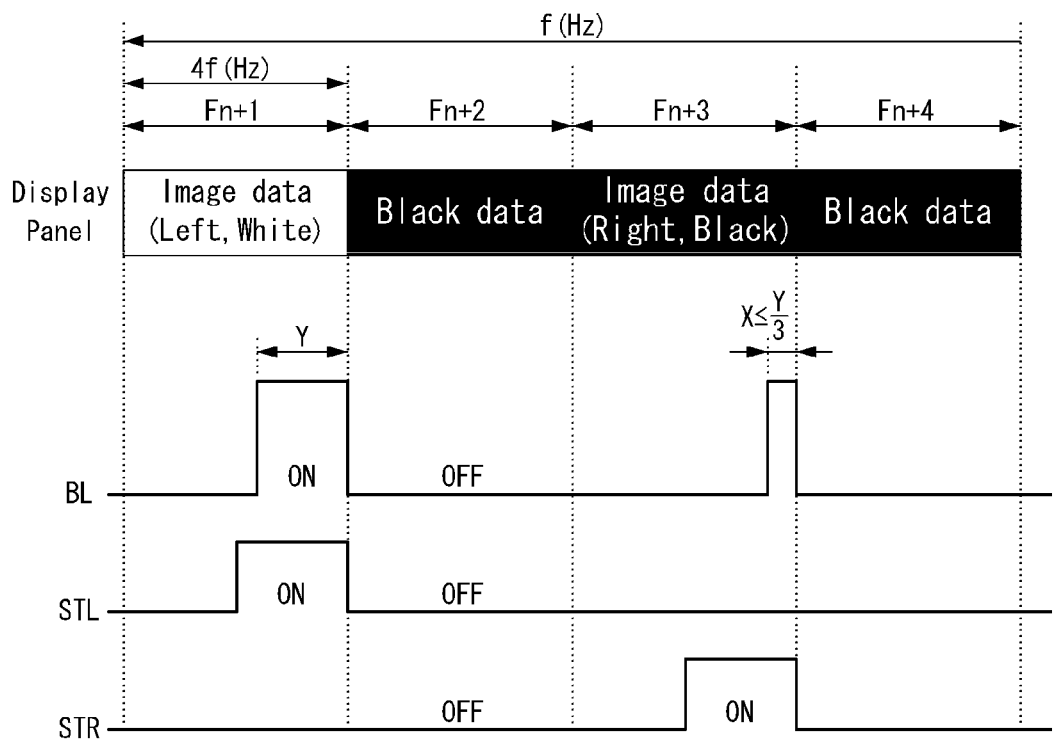
FIG. 6 shows an example of controlling the ON duty ratio of the light source in an LBRB method using a black data insertion technique according to the first exemplary embodiment of the present invention.

FIG. 6 shows an example of controlling the ON duty ratio of the light source in an LBRB method using a black data insertion technique.

The control circuit 11 time-divides an input frame into (n+1)th to (n+4)th frames Fn+1 to Fn+4 by multiplying the input frame frequency f(Hz) four times 4f (Hz). The control circuit 11 assigns left-eye image data to the left-eye frame, i.e., (n+1)th frame Fn+1, assigns right-eye image data to the right-eye frame, i.e., (n+3)th frame Fn+3, and assigns black data to the black frames, i.e., (n+2)th and (n+4)th frames Fn+2 and Fn+4. The control circuit 11 analyzes the left-eye image data to calculate the representative gray level value of the left-eye frame, and determines the luminance of the left-eye frame based on the representative gray level value of the left-eye frame. Also, the control circuit 11 analyzes the right-eye image data to calculate the representative gray level value of the right-eye frame, and determines the luminance of the right-eye frame based on the representative gray level value of the right-eye frame.

Moreover, as shown in FIG. 7, if the luminance of each of the left-eye and right-eye frames is less than a predetermined reference value, the image data is regarded as black and the ON duty ratio of the light source of the display device is controlled to a first set value. Otherwise, if the luminance of each of the left-eye and right-eye frames is greater than the predetermined reference value, the image data is regarded as white and the ON duty ratio of the light source of the display device is controlled to a second set value higher than the first set value. Here, the reference value may be set to 30% of the peak white luminance level. The first set value is 5%, and the second set value is 15 to 20%, preferably 17%.

For instance, as shown in FIG. 6, if the left-eye image data is displayed at white level in the (n+1)th frame Fn+1 on the display panel 15 and the right-eye image data is displayed at black level in the (n+3)th frame Fn+3 on the display panel 15, the control circuit 11 turns the light source BL on with a duty ratio of 17% (Y) within the (n+1)th frame Fn+1, and turns the light source BL on with a duty ratio of 5% (X) within the (n+3)th frame Fn+3. Next, the control circuit 11 opens the left-eye shutter STL of the liquid crystal shutter glasses 18 in a period overlapping with the light source turn-on period within the (n+1)th frame Fn+1, and the left-eye shutter STR of the liquid crystal shutter glasses 18 is opened in a period overlapping with the light source turn-on period within the (n+3)th frame Fn+3. By thusly decreasing the ON duty ratio of the light source BL in the black state, the luminance level of #3 in Equation 1 decreases and the luminance level of #2 in Equation 2 decreases. As a result, 3D crosstalk is significantly reduced.

Figure 8:
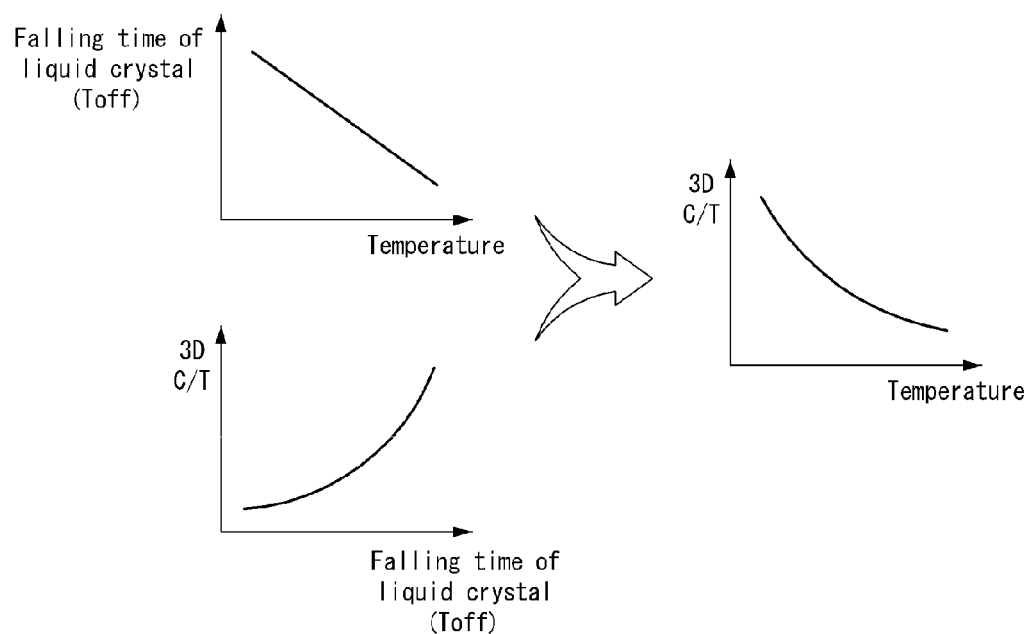
FIG. 8 is a view showing the relationship between 3D crosstalk and the temperature of the display panel.
Figure 9:
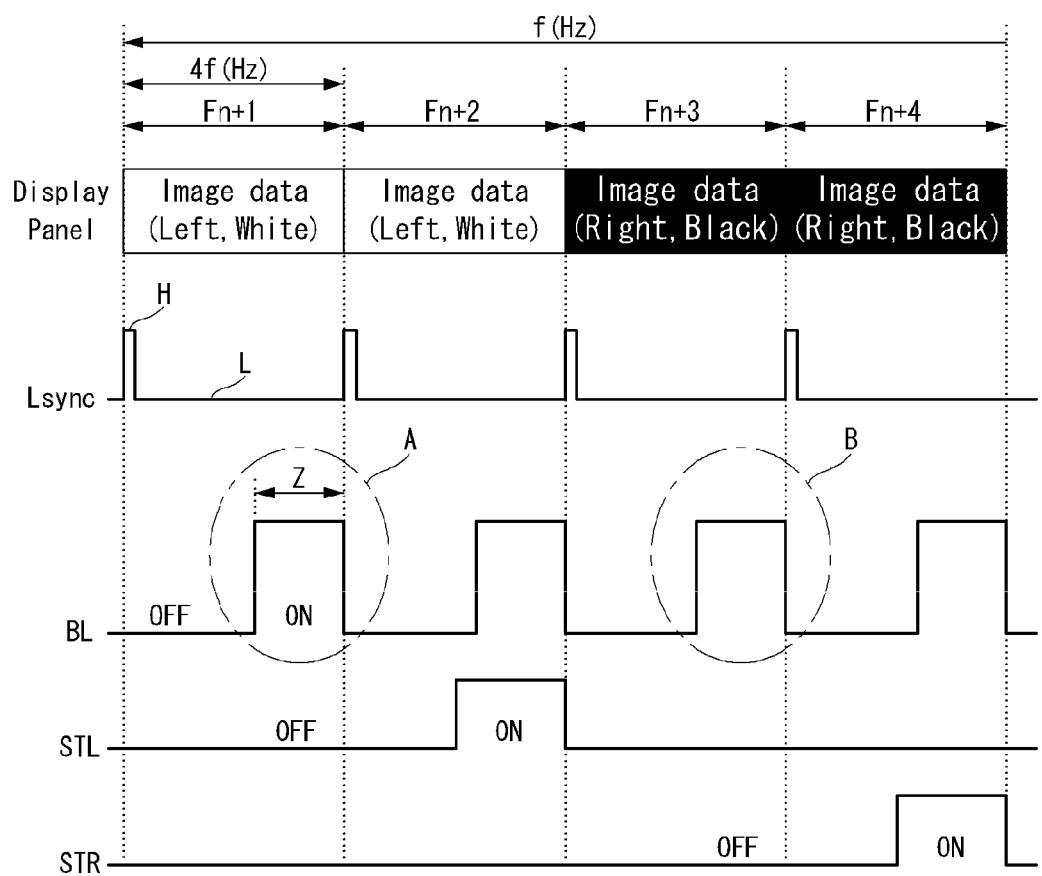
FIG. 9 shows an example of increasing the number of turn-ons of the light source in the LLRR method using a data doubling technique according to a second exemplary embodiment of the present invention.
Figure 10:
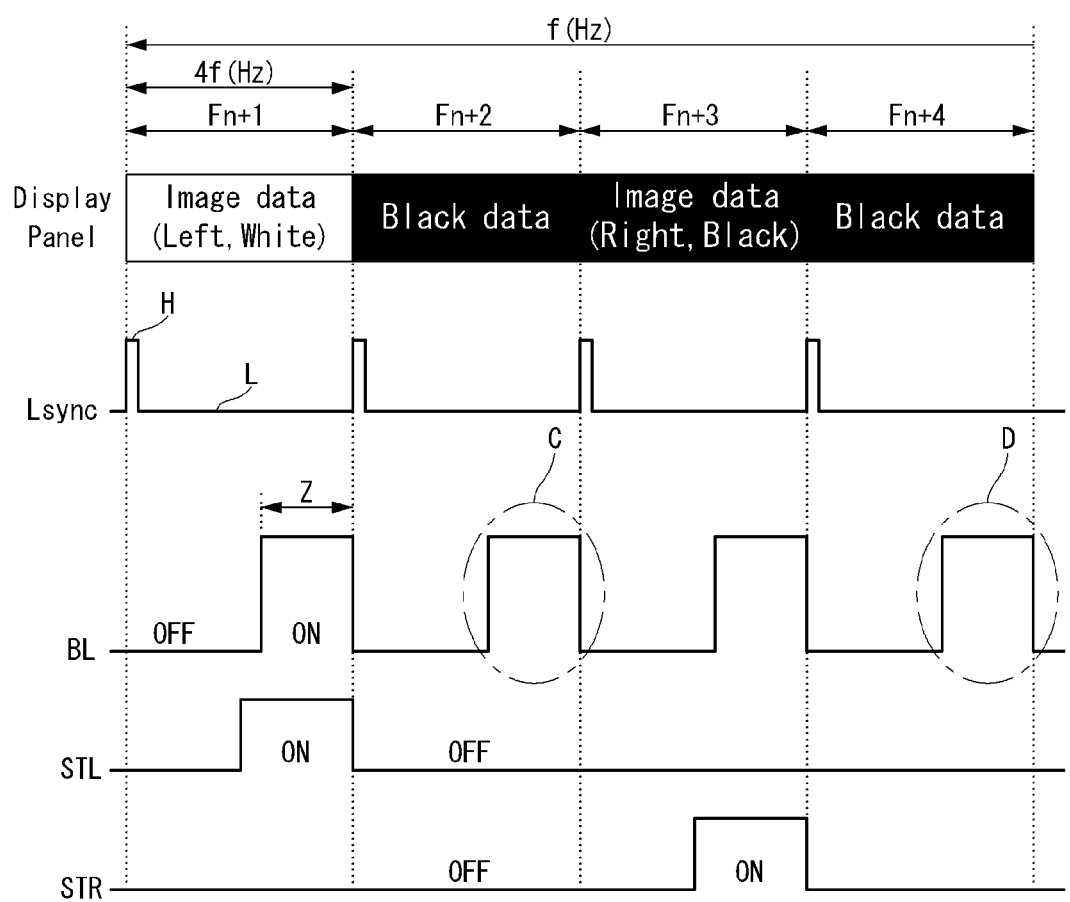
FIG. 10 is a view showing an example of increasing the number of turn-ons of the light source in the LBRB method using a black data insertion technique according to the second exemplary embodiment of the present invention.

FIGS. 8 to 10 show a second exemplary embodiment of the present invention for reducing 3D crosstalk.

A test showed that the falling time Toff of liquid crystal was inversely proportional to the temperature of the display panel 15. Also, it was shown that 3D crosstalk was proportional to the falling time Toff of liquid crystal. From this test result, it can be easily concluded that 3D crosstalk is inversely proportional to the temperature of the display panel 15 as shown in FIG. 8. Accordingly, there is a need to increase the temperature of the display panel 15 in order to reduce 3D crosstalk. To increase the temperature of the display panel 15, it is necessary to increase the ON duty ratio of the light source. In the second exemplary embodiment of the present invention, the ON duty ratio of the light source is substantially increased by doubling the number of turn-ons of the light source.

FIG. 9 shows an example of increasing the number of turn-ons of the light source in the LLRR method using a data doubling technique.

The control circuit 11 time-divides an input frame into (n+1)th to (n+4)th frames Fn+1 to Fn+4 by multiplying the input frame frequency f(Hz) four times 4f (Hz). The control circuit 11 assigns the same left-eye image data to the left-eye frames, i.e., (n+1)th and (n+2)th frames Fn+1 and Fn+2, and assigns the same right-eye image data to the right-eye frames, i.e., (n+3)th and (n+4)th frames Fn+3 and Fn+4. The control circuit 11 generates an ON sync control signal Lsync once for each frame, and controls the turn-on of the light source based on this ON sync control signal Lsync.

For instance, as shown in FIG. 9, if the same left-eye image data is displayed at white level in the (n+1)th and (n+2)th frames Fn+1 and Fn+2 on the display panel 15 and the same right-eye image data is displayed at black level in the (n+3)th and (n+4)th frames Fn+3 and Fn+4 on the display panel 15, the control circuit 11 turns the light source BL on with the same predetermined duty ratio Z within each of the frames Fn+1, Fn+2, Fn+3, and Fn+4. Next, the control circuit 11 opens the left-eye shutter STL of the liquid crystal shutter glasses 18 in a period overlapping with the light source turn-on period within the (n+2)th frame Fn+2, and the left-eye shutter STR of the liquid crystal shutter glasses 18 is opened in a period overlapping with the light source turn-on period within the (n+4)th frame Fn+4. Conventionally, the light source was not turned on in the (n+1)th and (n+3)th frames Fn+1 and Fn+3 which do not contribute to image display. In the second exemplary embodiment of the present invention, however, the temperature of the display panel 15 is increased by turning on each light source BL in the (n+1)th and (n+3)th frames Fn+1 and Fn+3 as well as shown in A and B of FIG. 9. As a result, 3d crosstalk is significantly reduced.

FIG. 10 shows an example of increasing the number of turn-ons of the light source in the LBRB method using a black data insertion technique.

The control circuit 11 time-divides an input frame into (n+1)th to (n+4)th frames Fn+1 to Fn+4 by multiplying the input frame frequency f(Hz) four times 4f (Hz). The control circuit 11 assigns left-eye image data to the left-eye frame, i.e., (n+1)th frame Fn+1, assigns right-eye image data to the right-eye frame, i.e., (n+3)th frame Fn+3, and assigns black data to the black frames, i.e., (n+2)th and (n+4)th frames Fn+2 and Fn+4. The control circuit 11 generates an ON sync control signal Lsync once for each frame, and controls the turn-on of the light source based on this ON sync control signal Lsync.

For instance, as shown in FIG. 10, if the left-eye image data is displayed at white level in the (n+1)th frame Fn+1 on the display panel 15 and the right-eye image data is displayed at black level in the (n+3)th frame Fn+3 on the display panel 15, the control circuit 11 turns the light source BL on with the same predetermined duty ratio (Z) within each of the frames Fn+1, Fn+2, Fn+3, and Fn+4. Next, the control circuit 11 opens the left-eye shutter STL of the liquid crystal shutter glasses 18 in a period overlapping with the light source turn-on period within the (n+1)th frame Fn+1, and the left-eye shutter STR of the liquid crystal shutter glasses 18 is opened in a period overlapping with the light source turn-on period within the (n+2)th frame Fn+2. Conventionally, the light source was not turned on in the (n+2)th and (n+4)th frames Fn+2 and Fn+4 which do not contribute to image display. In the second exemplary embodiment of the present invention, however, the temperature of the display panel 15 is increased by turning on each light source BL in the (n+2)th and (n+4)th frames Fn+2 and Fn+4 as well as shown in C and D of FIG. 10. As a result, 3d crosstalk is significantly reduced.

As discussed above, the stereoscopic image display device and driving method thereof according to the present invention can reduce 3D crosstalk by reducing the ON duty ratio of a light source further on a white state screen than on a black state screen while keeping the number of turn-ons of the light source equal to the number of times of opening the shutter. Moreover, the stereoscopic image display device and driving method thereof according to the present invention can increase the temperature of the display panel by increasing the number of turn-ons of the light source twice the number of times of opening the shutter, thus reducing 3D crosstalk. The reduction in 3D crosstalk may lead to higher display quality levels.

From the foregoing description, those skilled in the art will readily appreciate that various changes and modifications can be made without departing from the technical idea of the present invention. Therefore, the technical scope of the present invention is not limited to the contents described in the detailed description of the specification but defined by the appended claims.

What is claimed is:

1. A stereoscopic image display device comprising:
    a display device that displays left-eye image data in a left-eye frame and right-eye image data in a right-eye frame;
    liquid crystal shutter glasses that alternately open and close a left-eye shutter and a right-eye shutter in synchronization with the display device;
    a control circuit that controls the ON duty ratio of a backlight of the display device to a first set value if the luminance of each of the left-eye and right-eye frames is less than a predetermined reference value, and controls the ON duty ratio of the backlight of the display device to a second set value if the luminance of each of the left-eye and right-eye frames is greater than the reference value; wherein
    the left-eye frame comprises (n+1)th and (n+2)th frames displaying the same left-eye image data, and the right-eye frame comprises (n+3)th and (n+4)th frames displaying the same right-eye image data; and
    the backlight of the display device is turned on in the (n+2)th and (n+4)th frames.

2. The stereoscopic image display device of claim 1, wherein the reference value is set to 30% of the peak white luminance level.

3. The stereoscopic image display device of claim 1, wherein the control circuit calculates a representative gray level value of the left-eye frame by analyzing the left-eye image data and determines the luminance of the left-eye frame based on the representative gray level value of the left-eye frame; and
    calculates a representative gray level value of the right-eye frame by analyzing the right-eye image data and determines the luminance of the right-eye frame based on the representative gray level value of the right-eye frame.

4. The stereoscopic image display device of claim 1, wherein the first set value is less than ⅓ of the second set value.

5. The stereoscopic image display device of claim 4, wherein the first set value is 5%, and the second set value is 17%.

6. The stereoscopic image display device of claim 1, wherein the control circuit inserts a black frame between the left-eye frame and the right-eye frame;
    the left-eye frame is the (n+1)th frame, the right-eye frame is the (n+3)th frame, and the black frame is the (n+2)th and (n+4)th frames; and
    the backlight of the display device is turned on in the (n+1)th and (n+3)th frames.

7. A stereoscopic image display device comprising:
    a display device that displays left-eye image data in a left-eye frame and right-eye image data in a right-eye frame;
    liquid crystal shutter glasses that alternately open and close a left-eye shutter and a right-eye shutter in synchronization with the display device; and
    a control circuit that multiplies an input frame frequency to synchronize the display timing of the left-eye and right-eye image data with a 4× frame frequency, synchronize the turn-on timing of a backlight of the display device with the 4× frame frequency, and synchronize the shutter opening timing of the liquid crystal shutter glasses with a doubled frame frequency.

8. The stereoscopic image display device of claim 7, wherein the left-eye frame comprises (n+1)th and (n+2)th frames displaying the same left-eye image data, and the right-eye frame comprises (n+3)th and (n+4)th frames displaying the same right-eye image data;
    the backlight of the display device is turned on with the same predetermined duty ratio in the (n+1)th, (n+2)th, (n+3)th, and (n+4)th frames; and
    the left-eye shutter is opened in a period overlapping with the turn-on period of the backlight within the (n+2)th frame and the left-eye shutter is opened in a period overlapping with the turn-on period of the backlight within the (n+4)th frame.

9. The stereoscopic image display device of claim 7, wherein the control circuit inserts a black frame between the left-eye frame and the right-eye frame;
    the left-eye frame is the (n+1)th frame, the right-eye frame is the (n+3)th frame, and the black frame is the (n+2)th and (n+4)th frames;
    the backlight of the display device is turned on with the same predetermined duty ratio in the (n+1)th, (n+2)th, (n+3)th, and (n+4)th frames; and
    the left-eye shutter is opened in a period overlapping with the turn-on period of the backlight within the (n+1)th frame and the left-eye shutter is opened in a period overlapping with the turn-on period of the backlight within the (n+3)th frame.

10. A driving method of a stereoscopic image display device, the method comprising:
    displaying left-eye image data in a left-eye frame and right-eye image data in a right-eye frame;
    alternately opening and closing a left-eye shutter and a right-eye shutter in synchronization with the display device;
    controlling the ON duty ratio of a backlight of the display device to a first set value if the luminance of each of the left-eye and right-eye frames is less than a predetermined reference value, and controlling the ON duty ratio of the backlight of the display device to a second set value if the luminance of each of the left-eye and right-eye frames is greater than the reference value; wherein
    the left-eye frame comprises (n+1)th and (n+2)th frames displaying the same left-eye image data, and the right-eye frame comprises (n+3)th and (n+4)th frames displaying the same right-eye image data; and
    the backlight of the display device is turned on in the (n+2)th and (n+4)th frames.

11. The method of claim 10, wherein the reference value is set to 30% of the peak white luminance level.

12. The method of claim 10, wherein the controlling of the ON duty ratio of a backlight of the display device comprises:
    calculating a representative gray level value of the left-eye frame by analyzing the left-eye image data and determining the luminance of the left-eye frame based on the representative gray level value of the left-eye frame; and
    calculating a representative gray level value of the right-eye frame by analyzing the right-eye image data and determining the luminance of the right-eye frame based on the representative gray level value of the right-eye frame.

13. The method of claim 10, wherein the first set value is less than ⅓ of the second set value.

14. The method of claim 13, wherein the first set value is 5%, and the second set value is 17%.

15. The method of claim 10, further comprising inserting a black frame between the left-eye frame and the right-eye frame;
- the left-eye frame is the (n+1)th frame, the right-eye frame is the (n+3)th frame, and the black frame is the (n+2)th and (n+4)th frames; and
- the backlight of the display device is turned on in the (n+1)th and (n+3)th frames.

16. A driving method of a stereoscopic image display device, the method comprising:
- displaying left-eye image data in a left-eye frame and right-eye image data in a right-eye frame;
- alternately opening and closing a left-eye shutter and a right-eye shutter in synchronization with the display device; and
- multiplying an input frame frequency to synchronize the display timing of the left-eye and right-eye image data with a 4× frame frequency, synchronize the turn-on timing of a backlight of the display device with the 4× frame frequency, and synchronize the shutter opening timing of the liquid crystal shutter glasses with a doubled frame frequency.

17. The method of claim 16, wherein the left-eye frame comprises (n+1)th and (n+2)th frames displaying the same left-eye image data, and the right-eye frame comprises (n+3)th and (n+4)th frames displaying the same right-eye image data;
- the backlight of the display device is turned on with the same predetermined duty ratio in the (n+1)th, (n+2)th, (n+3)th, and (n+4)th frames; and
- the left-eye shutter is opened in a period overlapping with the turn-on period of the backlight within the (n+2)th frame and the left-eye shutter is opened in a period overlapping with the turn-on period of the backlight within the (n+4)th frame.

18. The method of claim 16, further comprising inserting a black frame between the left-eye frame and the right-eye frame;
- the left-eye frame is the (n+1)th frame, the right-eye frame is the (n+3)th frame, and the black frame is the (n+2)th and (n+4)th frames;
- the backlight of the display device is turned on with the same predetermined duty ratio in the (n+1)th, (n+2)th, (n+3)th, and (n+4)th frames; and
- the left-eye shutter is opened in a period overlapping with the turn-on period of the backlight within the (n+1)th frame and the left-eye shutter is opened in a period overlapping with the turn-on period of the backlight within the (n+3)th frame.

* * * * *